(12) United States Patent
Fullenkamp et al.

(10) Patent No.: US 7,226,271 B1
(45) Date of Patent: Jun. 5, 2007

(54) APPARATUS AND METHOD FOR FEEDING PLATES

(75) Inventors: Clint Fullenkamp, North Lewisburg, OH (US); Matt Tangeman, New Bremen, OH (US); David Oglesbee, Alger, OH (US)

(73) Assignee: Honda Motor Co., Ltd., Tokyo (JP)

( * ) Notice: Subject to any disclaimer, the term of this patent is extended or adjusted under 35 U.S.C. 154(b) by 361 days.

(21) Appl. No.: 10/852,533

(22) Filed: May 24, 2004

(51) Int. Cl.
 *B65H 59/02* (2006.01)
 *B24B 47/02* (2006.01)

(52) U.S. Cl. .............. 414/796.8; 414/796.9; 414/797.8; 221/151; 221/10; 451/335

(58) Field of Classification Search ........ 451/331, 451/334, 335; 221/10, 14, 222, 39, 259, 221/268, 270, 223, 232, 226, 239, 246, 248, 221/22; 414/798.6, 797.3, 797.9, 796.5, 414/796.8, 797.8, 416.03, 416.04, 416.09, 414/798.4, 938; 271/150, 152, 155, 94, 31.1, 271/31, 42; 198/577
See application file for complete search history.

(56) References Cited

U.S. PATENT DOCUMENTS

| 2,936,909 | A |   | 5/1960 | Gard |
| 2,942,392 | A |   | 6/1960 | McCain et al. |
| 3,160,996 | A |   | 12/1964 | Dunn |
| 3,195,740 | A |   | 7/1965 | Lange et al. |
| 3,626,818 | A |   | 12/1971 | Anson |
| 3,777,630 | A |   | 12/1973 | Roda |
| 3,976,208 | A |   | 8/1976 | Buix et al. |
| 4,072,476 | A | * | 2/1978 | Kulson ............... 451/335 |
| 4,407,063 | A | * | 10/1983 | Johnson .............. 29/623.2 |
| 4,413,941 | A |   | 11/1983 | Kollmann |
| 4,435,114 | A |   | 3/1984 | Fardin |
| 4,821,463 | A | * | 4/1989 | Fuller, Jr. ............ 451/335 |
| 4,824,308 | A |   | 4/1989 | Carboniero et al. |
| 5,106,260 | A |   | 4/1992 | Obrecht |
| 5,195,236 | A | * | 3/1993 | Miechowicki ........ 29/818 |
| 5,317,957 | A |   | 6/1994 | Miyamoto |
| 5,934,866 | A |   | 8/1999 | Redden |
| 6,318,956 | B1 |  | 11/2001 | Kobacker, II et al. |
| 6,397,728 | B1 |  | 6/2002 | Barber |
| 6,425,315 | B1 |  | 7/2002 | Kaneko et al. |

\* cited by examiner

*Primary Examiner*—Patrick Mackey
*Assistant Examiner*—Gregory W. Adams
(74) *Attorney, Agent, or Firm*—Rankin, Hill, Porter & Clark LLP; Vincent Ciamacco

(57) ABSTRACT

The present invention is directed to a plate feeder and a method of supplying plates. The plate feeder supplies plates on an as-needed basis and includes a holding structure for holding a plate. A proximity sensor detects whether a plate is held by the holding structure. A control system is connected to the proximity sensor to receive a plate absent signal therefrom. When the control system receives a plate absent signal, the control system commands a pusher to move a plate into an ejection area and then commands a blade with a non-linear front edge to engage a rear edge of the plate and push the plate from the ejection area to the holding structure, where the plate is available for use by a technician.

22 Claims, 6 Drawing Sheets

APPARATUS AND METHOD FOR FEEDING PLATES

BACKGROUND OF THE INVENTION

The present invention is directed toward feeders and, more particularly, toward feeders for supplying plate-like objects to a work area.

Plate feeders for continuously supplying plates to machines, or for continuously moving plates between different processes are known. Examples of such plate feeders are shown in U.S. Pat. No. 2,942,392 to McCain et al., U.S. Pat. No. 3,160,996 to Dunn and U.S. Pat. No. 3,195,740 to Lange et al. Such plate feeders are not suitable for supplying plates to a work area (such as on an assembly line) where the fed plates are manually worked on and/or manually installed into a device by an on-line technician. In such a situation, the on-line technician does not need the plates to be continually supplied to him/her, but rather needs the plates to be supplied to him/her on an as-needed basis.

Conventionally, the on-line technician is supplied with stacks of plates from which individual plates must be removed to be worked on and/or installed. In many applications, such as on an automotive assembly line, the plates are covered with oil and are difficult to separate from a stack. Accordingly, offline technicians often separate the plates and restack them in alternating positions to facilitate their removal from the stack by the online technician. As can be appreciated, this separating and restacking operation is tedious and time consuming.

Based on the foregoing, there exists a need in the art for a plate feeder that can supply plates to an online technician on an as-needed basis. The present invention is directed to such a plate feeder and to a method of feeding plates.

SUMMARY OF THE INVENTION

In accordance with the present invention, a feeder is provided for supplying plates to a technician in a work area. The feeder includes a holding structure for removably holding a plate in a holding position. A magazine is provided for holding a stack of plates. The magazine includes an ejection area from which a plate may be moved into the holding structure. The feeder also includes an ejector apparatus, a supply apparatus and a control system. The ejector apparatus has a movable blade that is movable between retract and eject positions, wherein movement of the blade from the retract to the eject position moves a plate disposed in the ejection area to the holding structure so as to be held by the holding structure in the holding position. The supply apparatus has a pusher that is movable in incremental amounts toward the ejection area, wherein movement of the pusher in an incremental amount toward the ejection area moves the stack of plates such that a plate from the stack is moved into the ejection area. The control system is operable to control the ejector apparatus and the supply apparatus such that a plate is moved into the ejection area and then moved from the ejection area to the holding structure so as to be held by the holding structure in the holding position.

In one aspect of the present invention, a plate detector is mounted proximate to the holding structure. The plate detector is operable to detect the absence of a plate in the holding position in the holding structure and to generate a plate absent signal representative thereof. The control system is operable to receive the plate absent signal and, in response thereto, to control the ejector apparatus and the supply apparatus to move the plate into the ejection area and then to the holding structure.

In another aspect of the present invention, the blade has a non-linear front edge that conforms to at least a portion of the rear edge of the plate, wherein when the blade moves from the retract position to the eject position, the front edge of the blade engages the rear edge of the plate and pushes the plate to the holding structure so as to be held by the holding structure in a holding position.

In accordance with another aspect of the present invention, a method of providing plates to a work area is provided. In accordance with the method, a stack of plates is provided and a plate is moved from the stack into an ejection area. A force is applied to a rear edge of the plate to move the plate from the ejection area to a holding area. The plate is held in the holding area and then moved to a work area. A determination is then made whether there is a plate in the holding area. If a plate is not in the holding area, another plate is moved into the ejection area and then into the holding area through the application of the force.

BRIEF DESCRIPTION OF THE DRAWINGS

The features, aspects, and advantages of the present invention will become better understood with regard to the following description, appended claims, and accompanying drawings where:

DETAILED DESCRIPTION OF THE PREFERRED EMBODIMENTS

Figure 1:
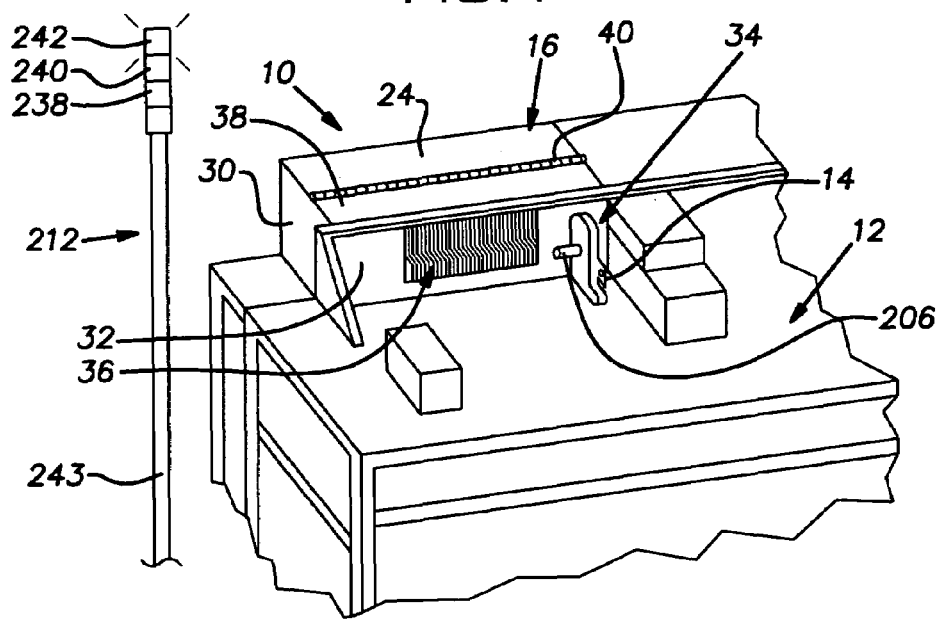
FIG. 1 is a front perspective view of a plate feeder embodied in accordance with the present invention, wherein the plate feeder is mounted to a table at a work station.

It should be noted that in the detailed description that follows, identical components have the same reference numerals, regardless of whether they are shown in different embodiments of the present invention. It should also be noted that in order to clearly and concisely disclose the present invention, the drawings may not necessarily be to scale and certain features of the invention may be shown in somewhat schematic form.

In the following description, certain terminology will be utilized for ease in reference and such terminology will be recognized as for descriptive purposes only and not intended as limiting. For example, the terms "upward" and "downward" and the like refer to directions taken with reference to the normal operating position of the plate feeder. The terms "inward" and "outward" and the like refer to directions toward and away from the geometric center of the plate feeder. The terms "rightward" and "leftward" refer to directions taken with respect to the drawings with respect to which said terminology is used. The terms "forward" and "rearward" refer to the normal direction of the movement of plates through the plate feeder. The foregoing references to particular words also include derivatives of said words, and words of similar import.

Referring now to FIG. 1, there is shown a plate feeder 10 embodied in accordance with the present invention. The plate feeder 10 is mounted to a work table 12 at a work station in a product assembly line. The work table 12 includes a work surface upon which tools and containers holding product components may be disposed. The plate feeder 10 is operable to feed plate-shaped components to a technician who installs the components in products being assembled. In a preferred application of the plate feeder 10 of the present invention, the product assembly line is an automotive transmission assembly line and the plate feeder 10 supplies transmission separator plates 14 (shown best in FIG. 4) to the work station for installation into automotive automatic transmissions. The plate feeder 10 generally comprises a housing 16, an ejector apparatus 18, a supply apparatus 20 and a control system 22.

The housing 16 is rectangular and includes top and bottom walls 24, 26, first and second end walls 28, 30, a front wall 32 and a rear wall (not shown). A holding structure 34 is secured to the front wall 32 and extends forwardly therefrom. The front wall 32 includes a window 36, through which the interior of the housing 16 may be viewed. A lid 38 is pivotally connected to the top wall 24 by a hinge 40.

Figure 2:
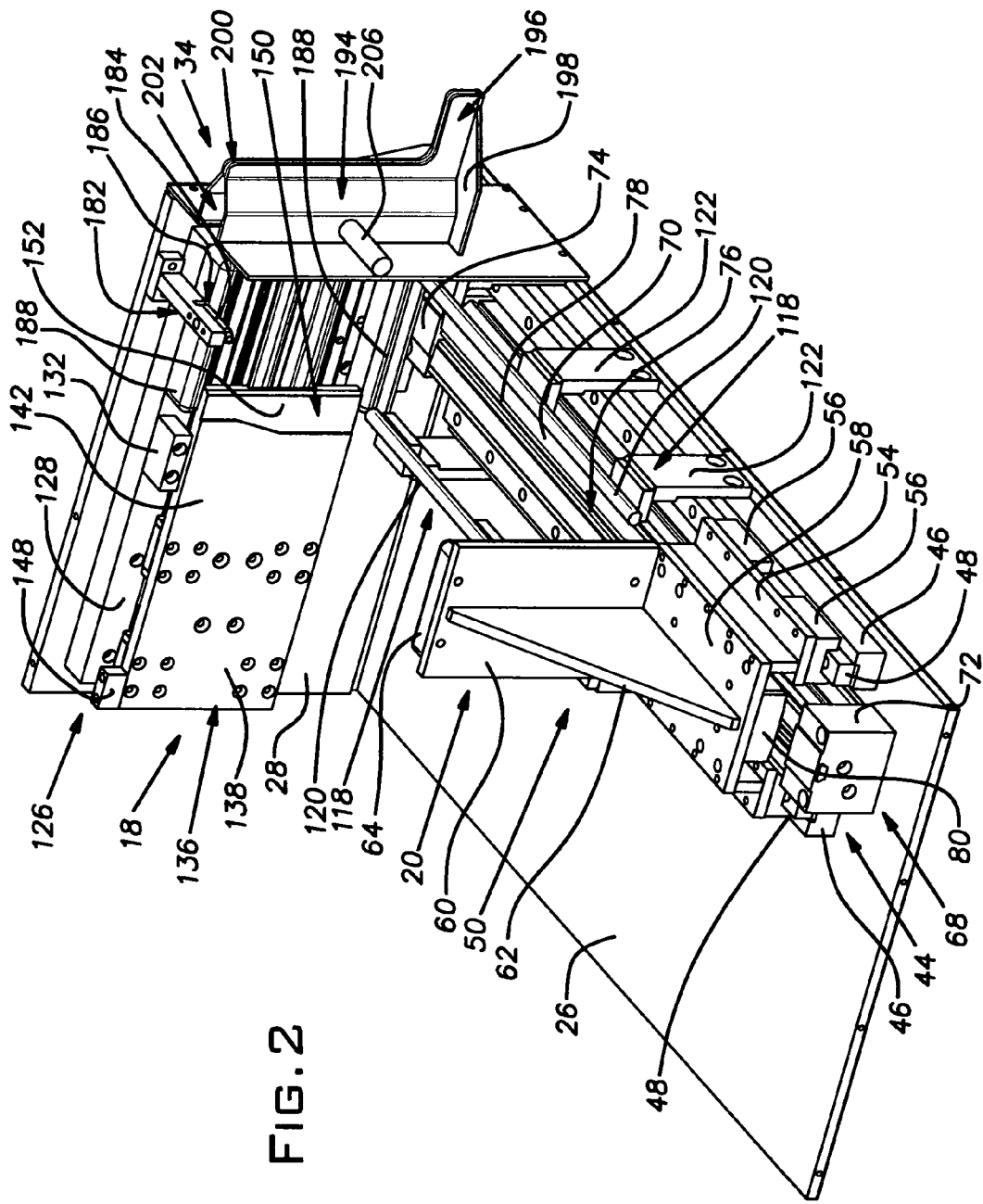
FIG. 2 is a front corner perspective of the plate feeder with portions of an outer housing removed to better show the interior of the plate feeder.
Figure 3:
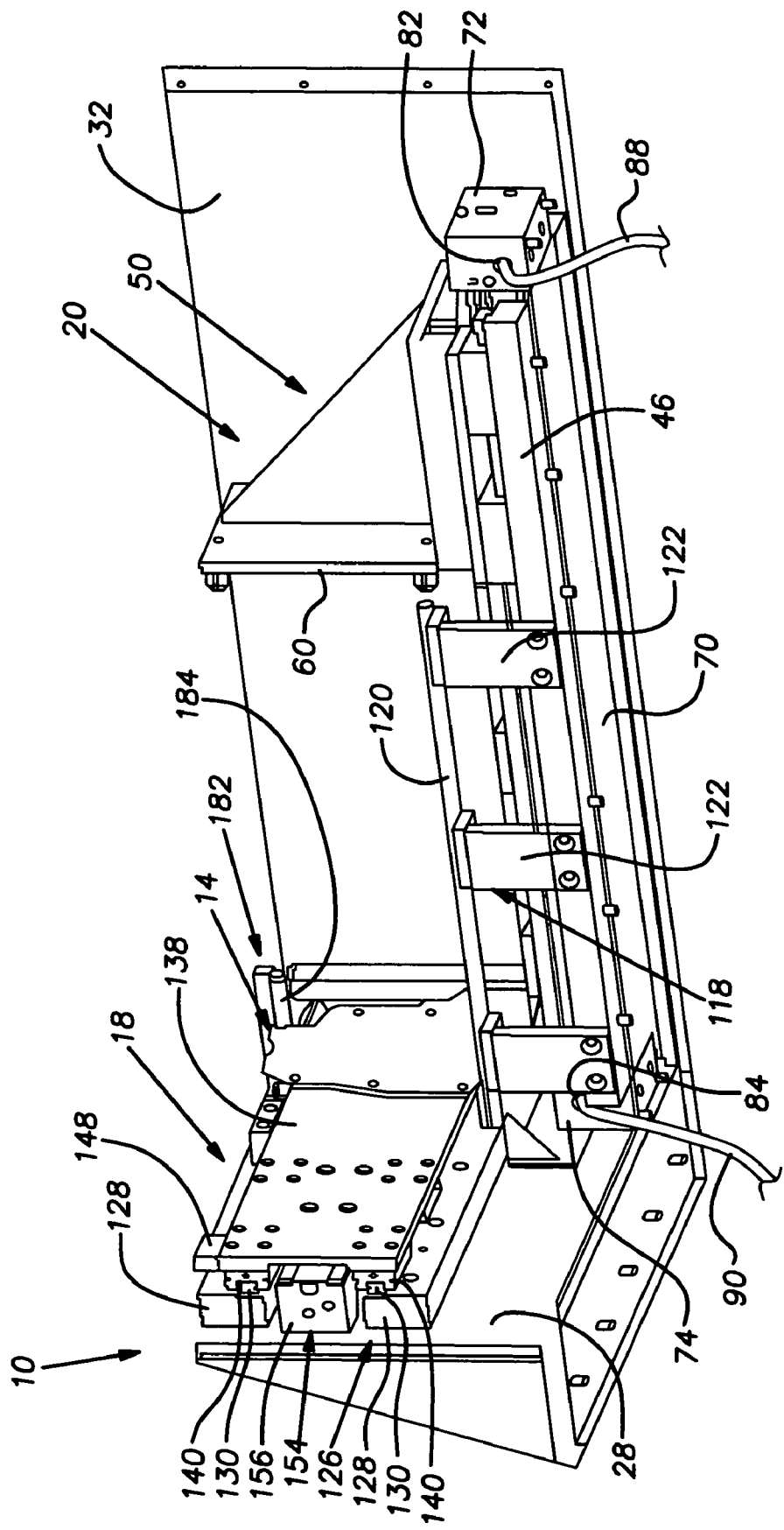
FIG. 3 is a bottom rear perspective view of the plate feeder with portions of an outer housing removed to better show the interior of the plate feeder.

Referring now also to FIGS. 2 and 3, the supply apparatus 20 and the ejector apparatus 18 are mounted to the bottom wall 26 of the housing 16 and are disposed at a substantially right angle to each other. The supply apparatus 20 includes a track structure 44 comprising a pair of spaced-apart rail mounts 46 secured to the bottom wall 26 of the housing 16 and having inwardly-directed ledges formed therein, respectively. A pair of rails 48 are secured on the ledges of the rail mounts 46, respectively. A push carriage 50 is mounted to the rails 48 for linear movement between a first or full position, wherein the push carriage 50 is disposed distal to the ejector apparatus 18, and a second or empty position, wherein the push carriage 50 is disposed proximate to the ejector apparatus 18. The push carriage 50 comprises a horizontally-disposed mounting plate 58 secured to a pair of spacers 54, which are, in turn, secured to a pair of guides 56, respectively. The guides 56 are disposed over the rails 48 and have downwardly-directed channels through which the rails 48 extend. The guides 56 may have ball bearings mounted in the channels to facilitate movement of the guides 56 over the rails 48. A push plate 60 is secured to a forward edge portion of the mounting plate 58 and extends upwardly therefrom at a substantially right angle thereto. A planar front surface of the push plate 60 faces the ejector apparatus 18. A triangular brace 62 is secured between a top surface of the mounting plate 58 and a rear surface of the push plate 60 to provide support for the push plate 60, especially in the direction of the track structure 44. A pair of pusher blocks 64 is secured to the front surface of the push plate 60. One of the pusher blocks 64 extends along an upper edge of the push plate 60, while the other pusher block 64 extends along a lower edge of the push plate 60. Each of the pusher blocks 64 is elongated and generally bar shaped, with all corners and edges being rounded to present a smooth outer surface.

The push carriage 50 is moved along the rails 48 between the full and empty positions by a linear push actuator 68. The push actuator 68 may be pneumatic or electric and may utilize rods or may be rodless. Preferably, the push actuator 68 is rodless and pneumatic. A suitable rodless pneumatic actuator that may be used is a Series MY1B rodless cylinder sold by SMC Corporation of America. The push actuator 68 is disposed between the rails 48 and extends along the lengths thereof. The push actuator 68 includes an elongated cylinder tube 70 secured between a first end cover 72 disposed distal to the ejector apparatus 18 and a second end cover 74 disposed proximate to the ejector apparatus 18. The cylinder tube 70 is secured to the bottom wall 26 of the housing 16 and defines an interior bore. A slot 76 is formed in a top portion of the cylinder tube 70 and extends along the length thereof. The slot 76 is sealed in an air tight manner by at least one flexible sealing band 78 extending between the first and second end covers 72, 74. A piston (not shown) is disposed inside the interior bore and is movable along the length thereof between a first or retracted position, wherein the piston is disposed proximate the first end cover 72, and a second or extended position, wherein the piston is disposed proximate to the second end cover 74. The piston has a first end facing the first end cover 72 and a second end facing the second end cover 74. A center portion of the piston is connected to a table 80 by a yoke that extends through the slot 76. The sealing band 78 extends through a narrow passage formed between the yoke and the table 80. The table 80 is movable with the piston along a travel path that extends longitudinally between the retracted and extended positions and is laterally positioned between the rails 48. The push carriage 50 is secured to the table 80 and is movable therewith. In this manner, movement of the piston between the retracted and extended positions moves the push carriage 50 between the full and empty positions, respectively.

The first and second end covers 72, 74 have ports 82, 84 through which compressed air is introduced into the bore or expelled from the bore. The ports 82, 84 are connected to a compressed air supply 86 by tubes 88, 90. Electric first and second pusher solenoid valves 92, 94 are connected into the tubes 88, 90 and are operable to control the flow of compressed air into and out of the ports 82, 84 in the first and second end covers 72, 74, respectively. The first and second pusher solenoid valves 92, 94 are electrically connected to the control system 22 by wiring 96, 98 to receive control signals therefrom. The first pusher solenoid valve 92 has a supply port for connecting the port 82 in the first end cover 72 to the compressed air supply 86 and a vent port for connecting the port 82 to the atmosphere. Similarly, the second pusher solenoid valve 94 has a supply port for connecting the port in the second end cover 74 to the compressed air supply 86 and a vent port for connecting the port 84 in the second end cover 74 to the atmosphere. When the first pusher solenoid valve 92 receives an open signal from the control system 22, the supply port of the first pusher solenoid valve 92 opens and the vent port of the first pusher solenoid valve 92 closes, thereby permitting compressed air to enter the bore through the port 82 in the first end cover 72, whereas when the first pusher solenoid valve 92 receives a close signal from the control system 22, the supply port of the first pusher solenoid valve 92 closes and the vent port of the first pusher solenoid valve 92 opens, thereby connecting the port 82 to the atmosphere. Similarly, when the second pusher solenoid valve 94 receives an open signal from the control system 22, the supply port of the second pusher solenoid valve 94 opens and the vent port of the second pusher solenoid closes, thereby permitting compressed air to enter the bore through the port 84 in the second end cover 74, whereas when the second pusher solenoid valve 94 receives a close signal from the control system, the supply port of the second pusher solenoid valve 94 closes and the vent port of the second pusher solenoid valve 94 opens, thereby connecting the port 84 to the atmosphere.

When compressed air is supplied to the bore through the port 82 in the first end cover 72, the compressed air impinges on the first end of the piston and moves the piston toward the extended position. Conversely, when compressed air is supplied to the bore through the port 84 in the second end cover 74, the compressed air impinges on the second end of the piston and moves the piston toward the retracted position. In this manner, the piston is moved between the retracted and extended positions by controlling the supply of compressed air to the first and second end covers 72, 74 through opening and closing of the first and second pusher solenoid valves 92, 94.

At least three position switches are mounted to the cylinder tube 70, along the length thereof, to detect the presence of the piston and, thus, the push carriage 50. A first position switch 102 is mounted proximate to the first end cover 72 and a second position switch 104 is mounted proximate to the second end cover 74. A third position switch 106 is mounted between the second end cover 74 and a midway point between the first and second end covers 72, 74. The first, second and third position switches 102, 104, 106 may be reed switches mounted in an exterior groove formed in a side wall of the cylinder tube 70. The first, second and third position switches 102, 104, 106 are electrically connected to the control system 22 by wiring through which the first, second and third position switches 102, 104, 106 may transmit detection signals to the control system 22. As will be described further below, the first, second and third position switches 102, 104, 106 transmit full, empty and low signals to the control system 22, respectively.

A pair of side structures 118 extend along the length of the rails 48, respectively, and are spaced outwardly from the travel path of the table 80 of the push actuator 68. Each of the side structures 118 comprises a guide rod 120 secured to a plurality of generally L-shaped brackets 122. The brackets 122 are secured to and extend upwardly from the rail mounts 46. As will be described more fully below, the guide rods 120 maintain the lateral orientation of a stack of the plates 14.

The ejector apparatus 18 includes a track structure 126 comprising a pair of spaced-apart rail mounts 128 secured to the first end wall 28 of the housing 16. An upper one of the rail mounts 128 has a downwardly-directed ledge formed therein, while a lower one of the rail mounts 128 has an upwardly-directed ledge formed therein. A pair of rails 130 are secured on the ledges of the rail mounts 128, respectively. Toward the supply apparatus 20, a block-shaped rail stop 132 is secured to an upper one of the rail mounts 128. A blade carriage 136 is mounted to the rails for linear movement between a first or retract position, wherein the blade carriage 136 is disposed distal to the supply apparatus 20, and a second or eject position, wherein the blade carriage 136 is disposed proximate to the supply apparatus 20. The blade carriage 136 comprises a blade 138 and two pairs of guides 140. One pair of guides 140 is secured to the blade 138 on an upper side thereof and one pair of guides 140 is secured to the blade 138 on a lower side thereof. The guides 140 have channels that open in the direction of the first end wall 28. The guides 140 are disposed over the rails 130 such that the rails 130 extend through the channels in the guides 140. The guides 140 may have ball bearings mounted in the channels to facilitate the movement of the guides 140 over the rails 130.

The blade 138 is substantially rectangular in shape and includes a planar inner or first surface 142 and an outer or second surface having an enlarged groove or channel formed therein. A block-shaped blade stop 148 is secured to the top edge of the blade 138, toward a first end of the blade 138. As will be described in more detail below, the blade stop 148 interacts with the rail stop 132 to prevent the blade 138 from traveling beyond the eject position. An enlarged recess 150 is formed in the blade 138 toward a second end of the blade 138. The recess 150 is defined in part by a planar recessed surface 152 and an interior edge 153 that separates the first surface 142 from the recessed surface 152. The interior edge 153 is shaped to correspond to the contour of a portion of an edge of the plates 14 that are to be dispensed from the plate feeder 10. In the particular embodiment of the invention shown in the drawings, the interior edge 153 is angular in shape and includes a sloping middle portion disposed between vertical upper and lower portions. A more detailed description of the plate 14 is provided below.

The blade 138 is secured to the guides and a table (not shown) by screws that extend through holes in the blade 138. The holes are countersunk such that the heads of the screws are disposed at or below the first surface of the blade 138. Thus, the heads of the screws do not protrude from the first surface, which could damage the plates being dispensed from the plate feeder 10. In this regard, it should be noted the first surface 142 and the recessed surface 152 are smooth and do not have any burs, edges or protrusions that can damage the plates 14. In addition, the second end of the blade 138 has a rounded edge to prevent the edge from catching one of the plates 14.

The blade carriage 136 is moved along the rails 130 between the return and eject positions by a linear blade actuator 154. The blade actuator 154 may be pneumatic or electric and may utilize rods or may be rodless. Preferably, the linear actuator is rodless and pneumatic. More preferably, the blade actuator 154 has substantially the same construction as the push actuator 68. Accordingly, for purposes of brevity, the description of the structure and function of the blade actuator 154 and its components will be somewhat abbreviated, it being understood that the description is substantially the same as the description of the structure and function of the push actuator 68 and its components set forth above. The blade actuator 154 is disposed between the rails 130 and extends along the lengths thereof. The blade actuator 154 includes an elongated cylinder tube 155 secured between a first end cover 156 disposed distal to the supply apparatus 20 and a second end cover 158 disposed proximate to the supply apparatus 20. The cylinder tube 155 is secured to the first end wall 28 of the housing 16 and defines an interior bore (not shown). A piston (not shown) is disposed in the interior bore and is connected to a blade table (not shown). The piston and the blade table are movable along a travel path that is laterally positioned between the rails 130 and extends longitudinally between a first or retracted position, wherein the piston and the blade table are disposed proximate the first end cover 156, and a second or extended position, wherein the piston and the blade table are disposed proximate the second end cover 158. The blade carriage 136 is secured to the blade table and is movable therewith. In this manner, movement of the piston between the retracted and extended positions moves the blade carriage 136 between the retract and eject positions, respectively.

Ports (not shown) in the first and second end covers 156, 158 of the blade actuator 154 are connected by tubes 160, 162 to the compressed air supply 86. Electric first and second blade solenoid valves 164, 166 are connected into the tubes 160, 162 and are operable to control the flow of compressed air into and out of the ports in the first and second end covers 156, 158, respectively. The first and second blade solenoid valves 164, 166 are electrically connected to the control system 22 by wiring 168, 170 to receive control signals therefrom. The first blade solenoid valve 164 has a supply port for connecting the port in the first end cover 156 to the compressed air supply 86 and a vent port for connecting the port in the first end cover 156 to the atmosphere. Similarly, the second blade solenoid valve 166 has a supply port for connecting the port in the second end cover 158 to the compressed air supply 86 and a vent port for connecting the port in the second end cover 158 to the atmosphere. When the first blade solenoid valve 164 receives an open signal from the control system 22, the supply port of the first blade solenoid valve 164 opens and the vent port of the first blade solenoid valve 164 closes, thereby permitting compressed air to enter the bore through the port in the first end cover 156, whereas when the first blade solenoid valve 164 receives a close signal from the control system 22, the supply port of the first blade solenoid valve 164 closes and the vent port of the first blade solenoid valve 164 opens, thereby connecting the port in the first end cover 156 to the atmosphere. Similarly, when the second blade solenoid valve 166 receives an open signal from the control system 22, the supply port of the second blade solenoid valve 166 opens and the vent port of the second blade solenoid valve 166 closes, thereby permitting compressed air to enter the bore through the port in the second end cover 158, whereas when the second blade solenoid valve 166 receives a close signal from the control system 22, the supply port of the second blade solenoid valve 166 closes and the vent port of the second blade solenoid valve 166 opens, thereby connecting the port in the second end cover 158 to the atmosphere.

When compressed air is supplied to the bore through the port in the first end cover 156, the compressed air impinges on the first end of the piston and moves the piston toward the extended position. Conversely, when compressed air is supplied to the bore through the port in the second end cover 158, the compressed air impinges on the second end of the piston and moves the piston toward the retracted position. In this manner, the piston is moved between the retracted and extended positions by controlling the supply of compressed air to the first and second end covers 156, 158 through opening and closing of the first and second blade solenoid valves 164, 166.

First and second position switches 174, 176 are mounted to the cylinder tube 155, along the length thereof, to detect the presence of the piston and, thus, the blade carriage 136. The first position switch 174 is mounted proximate to the first end cover 156 and the second position switch 176 is mounted proximate to the second end cover. The first and second position switches 174, 176 may be reed switches mounted in an exterior groove formed in a side wall of the cylinder tube 155. The first and second position switches 174, 176 are electrically connected to the control system 22 by wiring through which the first and second position switches 174, 176 may transmit detection signals to the control system 22. As will be described further below, the first and second position switches 174, 176 transmit retract and eject signals to the control system 22, respectively.

A guide structure 182 is secured in cantilever fashion to the first end wall 28 of the housing 16 and extends inwardly, toward the supply apparatus 20. The guide structure 182 extends in the direction of the track structure 44 of the supply apparatus 20 and is positioned so as to be about midway between the rails 48 of the track structure 44. The guide structure 182 has a base portion joined to a thinner finger portion. A guide 184 is secured to a bottom surface of the finger portion. The guide 184 is generally bar shaped, with all corners and edges being rounded to present a smooth outer surface. A downwardly-opening slot 186 is formed in the guide structure 182 at the juncture between the base portion and the finger portion. The slot 186 extends in the direction of the rails 130 of the ejector apparatus 18 and is aligned with the interior edge 153 of the blade 138. The slot 186 is defined in part by an end surface of the base portion and an end surface of the guide 184. As will be described more fully below, the guide structure 182 ensures that only one plate 14 is ejected from the plate feeder 10 at a time.

Below the guide structure 182, a pair of bumpers 188 are secured to the rail mounts 128, respectively, and extend in the direction of the rail mounts 128. Each of the bumpers 188 is elongated and generally bar shaped, with all corners and edges being rounded to present a smooth outer surface. The bumpers 188 interact with the pusher blocks 64 on the push plate 60 to prevent the push plate 60 from traveling beyond the empty position.

Below a lower one of the bumpers 188, a shelf support 190 is secured to the first end wall 28. The shelf support 190 includes a horizontal support wall 192 for vertically supporting a plate 14 that is to be dispensed from the plate feeder 10. The blade 138, the support wall 192 and the bumpers 188 of the ejector apparatus 18 cooperate with the pusher blocks 64 and the side structures 118 of the supply apparatus 20 to define a magazine for holding a horizontal stack of the plates 14. The interior edge 153 of the blade and the support wall help define an ejection area of the magazine from which the plates 14 are moved to the holding structure 34.

The ejection area is aligned with the holding structure 34 of the housing 16. The holding structure 34 includes an inner entrance portion 194 joined to an outer exit portion 196. The entrance portion 194 and the exit portion 196 are secured to and extend upwardly from a horizontal lower wall 198. The exit portion 196 is L-shaped and defines a narrow vertically-extending exit slot 200. The entrance portion 194 defines an interior passage 202 and includes a pair of inwardly-sloping walls that narrow the passage 202. The passage 202 of the entrance portion is aligned with and in communication with the exit slot 200 of the exit portion 196. The inwardly-sloping walls of the entrance portion help guide ejected plates into the exit slot 200. Together, the passage 202 and the exit slot 200 define an exit path that is aligned with the ejection area.

A proximity sensor 206 is mounted to the holding structure 34 to detect the presence of a plate 14 in the holding structure 34. The proximity sensor 206 is preferably an inductive proximity sensor and includes a barrel that extends through an opening in the entrance portion 194 of the holding structure 34 such that an end of the barrel is disposed in the passage 202. The proximity sensor 206 is electrically connected to the control system 22 by wiring 208 through which the proximity sensor 206 may transmit a plate absent signal to the control system 22.

Figure 5:
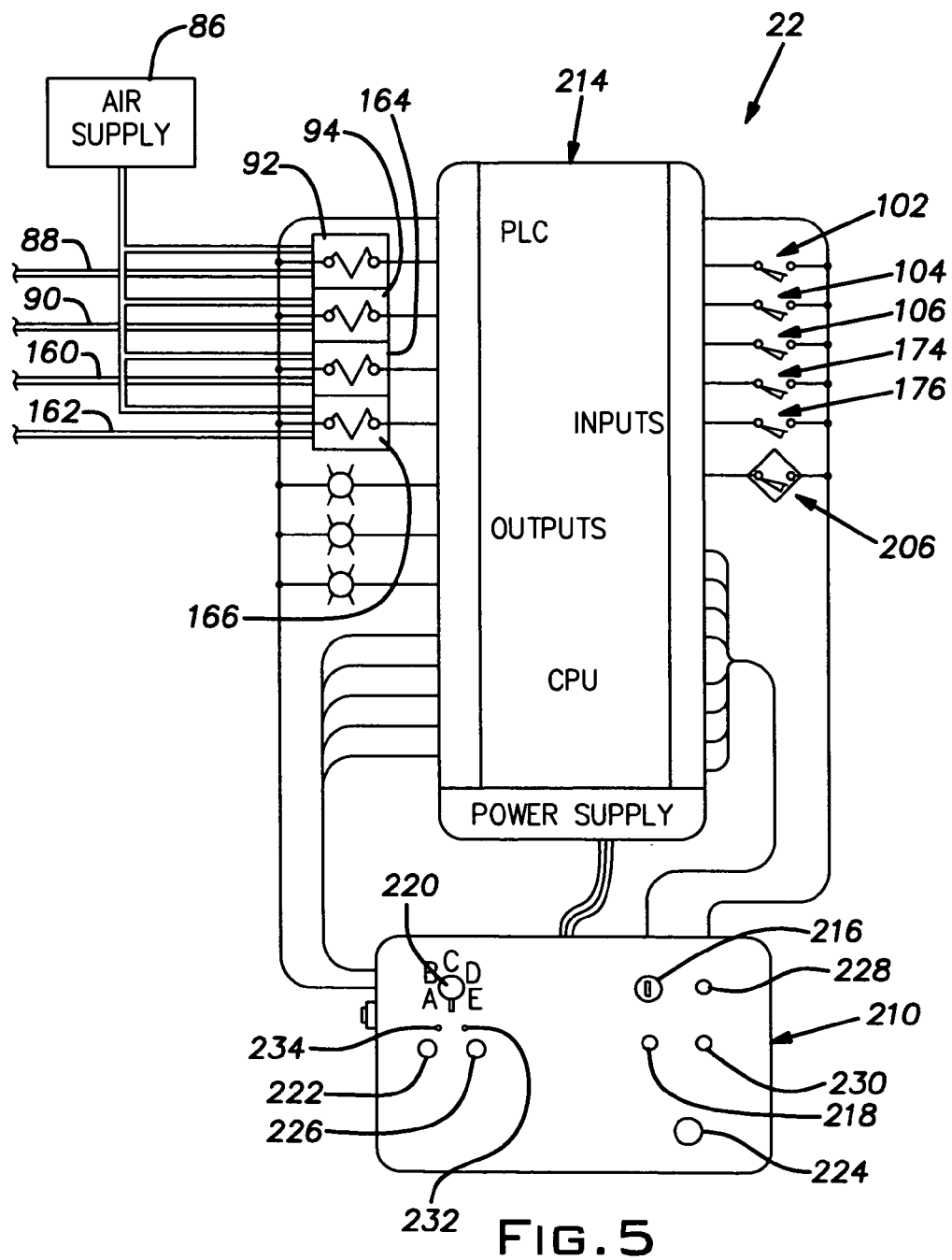
FIG. 5 is a schematic view of a control system of the plate feeder.

Referring now to FIG. 5 there is shown a schematic drawing of the control system 22, which controls the operation of the plate feeder 10. The control system 22 includes a control panel 210, a light tower 212 and a programmable logic controller (PLC) 214.

The control panel 210 is mounted to a rear portion of the work table 12 and is disposed below the plate feeder 10. The control panel 210 includes a plurality of operator interface devices in the form of a master power switch 216, a control power pushbutton 218, an operation selector switch 220, an execute pushbutton 222, an emergency stop pushbutton 224, an auto running indicator light 226, a master power indicator light 228, a control power indicator light 230, a blade extend LED 232 and a blade retract LED 234. The operator interface devices are electrically connected to the PLC 214 by wiring and are operable to display status signals received from the PLC 214 and to transmit control signals to the PLC 214, as will be further described below.

The master power switch 216 is operable to disconnect and connect 120 VAC main power from a power source to the control system 22, including the PLC 214, while the control power pushbutton 218 is operable disconnect and connect 24VDC control power from the PLC 214 to the field devices, e.g., the first and second pusher solenoid valves 92, 94. The emergency stop pushbutton 224 is operable to disconnect the main power to the PLC 214 and to disconnect the control power to the field devices. The master power indicator light 228 and the control power indicator light 230 provide visual indications whether the main power and the control power are disconnected or connected.

The operation selector switch 220 is movable between positions A, B, C, D and E to select a desired control operation corresponding to the selected position, wherein position A corresponds to a pusher retract operation, position B corresponds to a pusher extend operation, position C corresponds to an automatic operation, position D corresponds to a blade extend operation and position E corresponds to a blade retract operation. Signals from the operator selector switch 220 for the positions A, B, C, D and E are transmitted to the PLC 214 over the wiring. The PLC 214 uses a selected one of these signals in conjunction with a signal from the execute pushbutton 222 to place the control system 22 in an automatic mode, or to generate a control signal to the first pusher solenoid valve 92, the second pusher solenoid valve 94, the first blade solenoid 164, or the second blade solenoid 166. More specifically: when the operation selector switch 220 is moved to position A (pusher retract operation) and the execute pushbutton 222 is depressed, the PLC 214 generates an open signal that is transmitted to the second pusher solenoid valve 94; when the operation selector switch 220 is moved to position B (pusher extend operation) and the execute pushbutton 222 is depressed, the PLC 214 generates an open signal that is transmitted to the first pusher solenoid valve 92; when the operation selector switch 220 is moved to position C (automatic operation) and the execute pushbutton 222 is depressed, the PLC 214 executes an automatic routine; when the operation selector switch 220 is moved to position D (blade extend operation) and the execute pushbutton 222 is depressed, the PLC 214 generates an open signal that is transmitted to the first blade solenoid 164; and when the operation selector switch 220 is moved to position E (blade retract operation) and the execute pushbutton 222 is depressed, the PLC 214 generates an open signal that is transmitted to the second blade solenoid 166.

The light tower 212 is disposed adjacent to the work table 12 and includes a green light 238, an orange light 240 and a red light 242 supported on top of an elongated pole 243. The green, orange and red indicator lights 238, 240, 242 are connected by wiring to the PLC 214 to receive signals therefrom. As will be described further below, the light tower 212 displays the status of the plate feeder 10 with regard to the supply of plates 14 held therein. More specifically: if the green light 238 is lit, the supply of plates 14 in the plate feeder 10 is at an acceptable level; if the orange light 240 is lit, the supply of plates 14 in the plate feeder 10 is low; and if the red light 242 is lit, the supply of plates 14 in the plate feeder 10 is depleted, i.e., the plate feeder 10 is empty.

The PLC 214 may be any commercially available PLC, however, a MELSEC series PLC from Mitsubishi Automation, and, more specifically, a Mitsubishi MELSEC FX1N-40MR, has been found especially suitable for use as the PLC 214. The PLC 214 includes a base unit having a CPU, integrated power supply and a plurality of digital input and output terminals. The CPU implements control strategies for the plate feeder 10 utilizing a control program written in a PLC language or a combination of PLC languages. Suitable PLC languages include ladder diagram, structured text, function block diagram, instruction list and sequential function (or flow) chart (SFC) and combinations of the foregoing. Preferably, the control program and the PLC language(s) are compatible with IEC61131 standards. When a Mitsubishi MELSEC FX1N-40MR is used, a ladder diagram language or instruction list is used as the PLC language.

Before the plate feeder 10 can be activated to feed plates 14 to the holding structure 34, the magazine must be loaded with plates 14. In order to do so, the push carriage 50 must first be moved to the full position. This operation is accomplished by moving the operation selector switch 220 to position A (pusher retract operation) and then depressing the execute pushbutton 222, which causes the PLC 214 to generate and transmit an open signal to the second pusher solenoid valve 94. In response to the open signal, the second pusher solenoid valve 94 opens and compressed air enters the second end cover 74 of the push actuator 68, thereby moving the piston and, thus, the push carriage 50 to the full position. When the PLC 214 receives a full signal from the first position switch 102, which indicates that the push carriage 50 is in the full position, the PLC 214 generates and transmits a close signal to the second pusher solenoid valve 94. Once the push carriage 50 is in the full position, main power to the control system 22 is disconnected and the lid 38 is pivoted to an open position. A gate plug (not shown) may be provided on the housing 16 for disconnecting the main power, wherein the gate plug must be pulled (thereby disconnecting the main power) in order to open the lid 38. With the push carriage 50 in the full position and the lid 38 in the open position, plates 14 are loaded into the plate feeder 10 to form a horizontal stack in the magazine.

Referring back to FIG. 4, each plate 14 is composed of a metal, such as steel or aluminum, and is roughly rectangular in shape. Each plate 14 includes irregularly shaped front and rear edges 244, 246 and irregularly shaped top and bottom edges 248, 250. The bottom edge 250 is supported on the support wall 192 of the shelf support 190. The rear edge 246 includes an angular portion 246a that corresponds to the contour of the interior edge 153 of the blade 138.

The plates 14 are loaded into the magazine so as to be disposed in a horizontally-extending stack, wherein all of the plates 14 are aligned with each other. The stack is formed in the magazine so as to extend the length of the magazine when the push carriage 50 is in the full position. The stack is positioned in the magazine such that the rear edges 246 of the plates 14 are disposed toward the blade 138, while the front edges 244 of the plates 14 are disposed toward the holding structure 34. The stack extends between and is supported on the guide rods 120 of the side structures 118. With the stack so positioned, the top edges 248 of the plates 14 are disposed rearward of the guide structure 182, toward the first end cap of the blade actuator 154. With regard to each plate 14, the top edge 248 is disposed above a lowermost surface of the guide 184. As will be described further below, this positioning ensures that only one plate 14 is moved into the holding structure 34 at a time.

Figure 4:
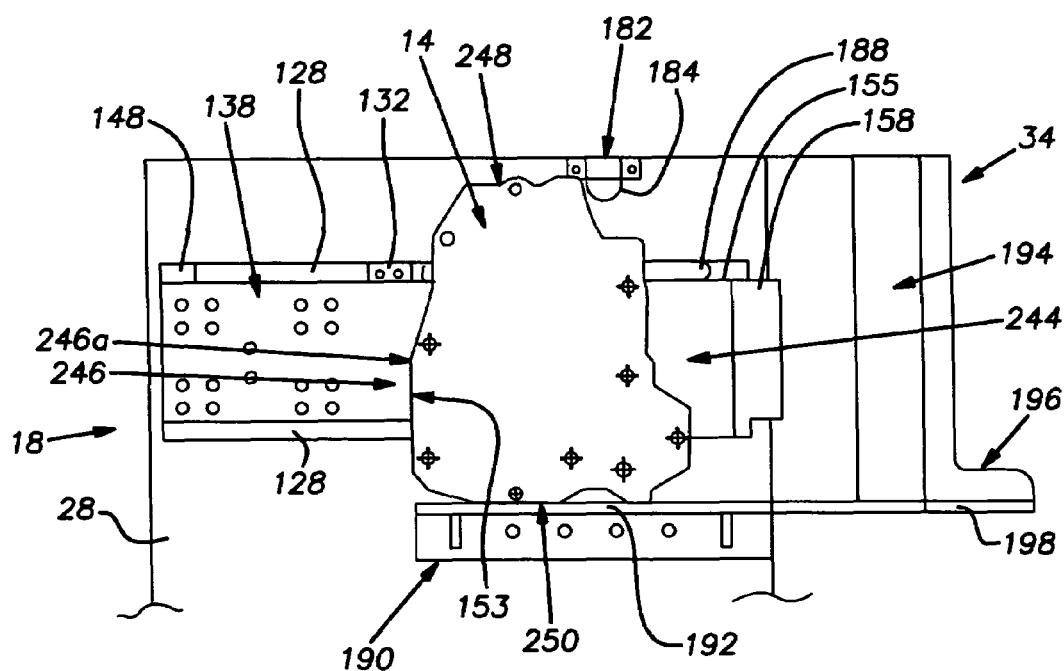
FIG. 4 is a side view of an ejector apparatus of the plate feeder.
Figure 6:
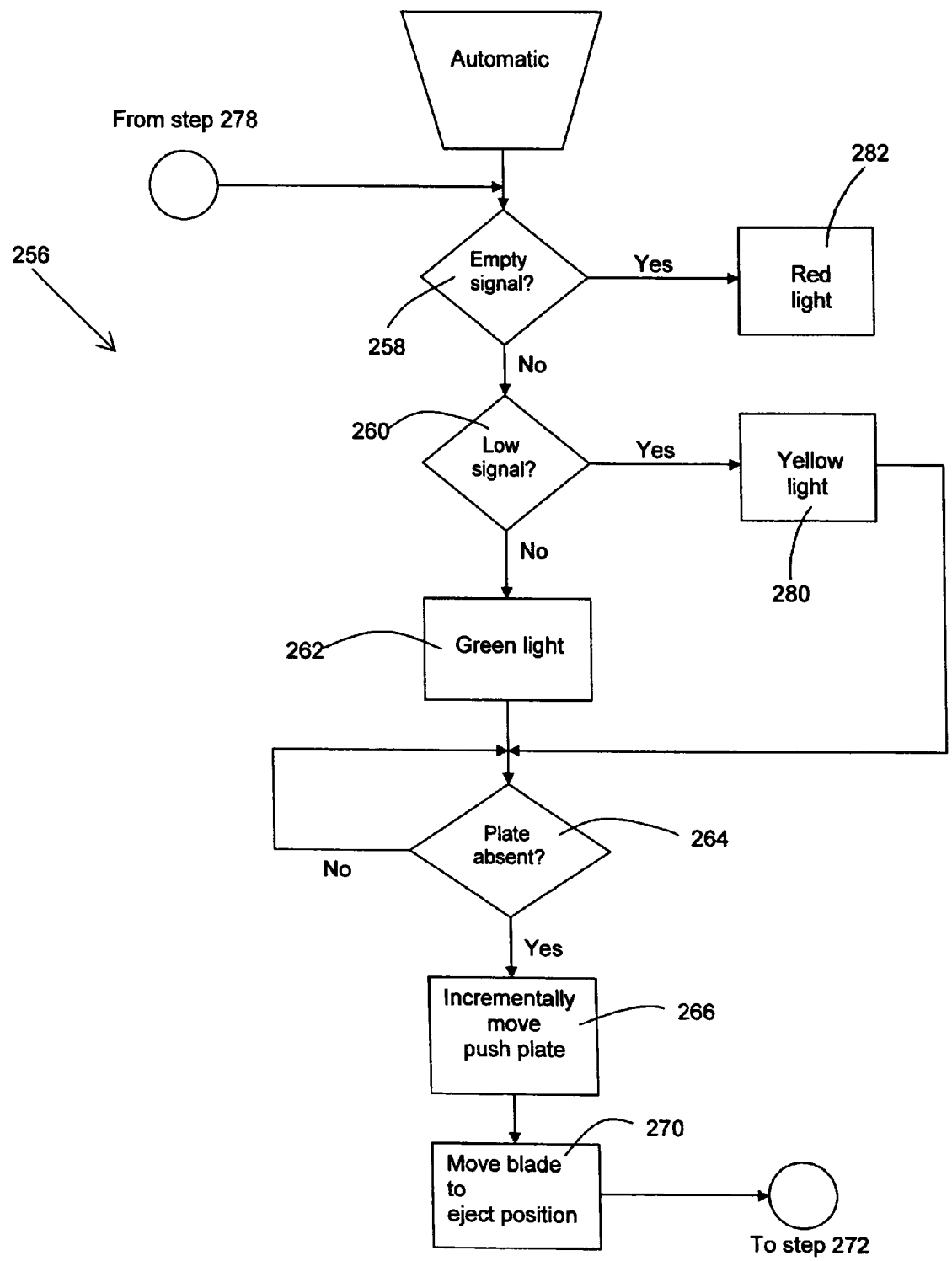
FIG. 6 is a flow diagram of a first portion of an automatic control routine of the control system.
Figure 7:
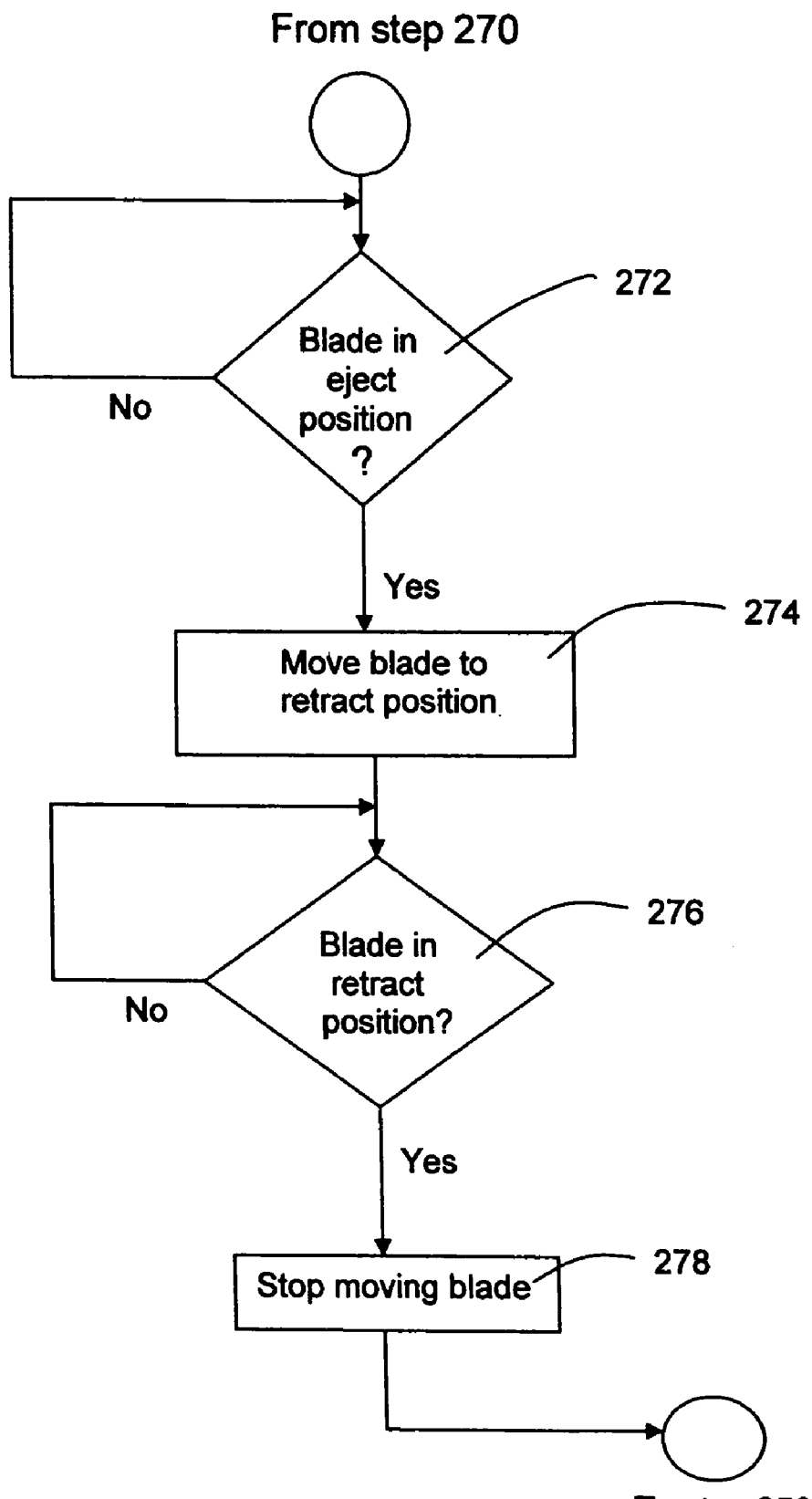
FIG. 7 is a flow diagram of a second portion of an automatic control routine of the control system.

The control system 22 controls the operation of the plate feeder 10 to sequentially feed plates 14 from the magazine to the holding structure 34, where they can be accessed by a technician. The control system 22 can operate in an automatic mode, or in a manual mode. The control system 22 typically operates in the automatic mode when the transmission assembly line is running. The control system 22 is placed in the automatic mode by moving the operation selector switch 220 to position C (automatic operation) and then depressing the execute pushbutton 222, which causes the PLC 214 to enter an automatic routine 256, which is shown in FIGS. 6 and 7. In a first step 258, the routine looks for an empty signal from the second position switch 104 of the push actuator 68. If an empty signal has not been received, the routine 256 moves to the next step 260 and looks for a low signal from the third position switch 106 of the push actuator 68. If a low signal has not been received, the routine 256 moves to step 262 and generates and transmits an OK signal to the green light 238 of the light tower 212, thereby lighting the green light 238. The routine 256 then moves to step 264 and looks for a plate absent signal from the proximity sensor 206, which indicates that a plate 14 is not present in the holding structure 34. Step 264 is repeated until a plate absent signal is detected. When a plate absent signal is detected, the routine 256 moves to step 266, wherein an open signal and then a close signal are generated and transmitted to the first pusher solenoid valve 92. The time period between the open and close signals is brief, which causes the first pusher solenoid valve 92 to open only briefly to introduce compressed air into the first end cover 72 of the push actuator 68. The brief introduction of compressed air into the first end cover 72 moves the piston of the push actuator 68 and, thus, the push plate 60 a short incremental distance, thereby moving a foremost plate 14 into the ejection area such that the angular portion 246a of the rear edge 246 of the foremost plate 14 is disposed against or in close proximity to the interior edge 153 of the blade 138, as is shown in FIG. 4. The incremental distance is preferably the thickness of a single plate 14. After the open and close signals are transmitted to the first pusher solenoid valve 92, the routine 256 proceeds to step 270, wherein an open signal is generated and transmitted to the first blade solenoid valve 164. The open signal opens the first blade solenoid valve 164 to introduce compressed air into the first end cover 156 of the blade actuator 154. The compressed air moves the piston of the blade actuator 154 and, thus, the blade 138 toward the eject position. As the blade 138 moves toward the eject position, the interior edge 153 of the blade 138 presses against the angular portion 246a of the rear edge 246 of the foremost plate 14 and pushes the plate 14 forward, toward the holding structure 34. As the foremost plate 14 moves forward, the top edge 248 of the plate 14 passes through the slot 186 in the guide structure 182. If a second plate 14 is adhered to the foremost plate 14, the second plate 14 will be unable to pass through the slot 186 and, instead, will be blocked from moving forward by the guide 184. In this manner, only the foremost plate 14 is allowed to move forward. The blade 138 continues to push the foremost plate 14 forward until the blade stop 148 contacts the rail stop 132, at which point the blade 138 is in the eject position and further forward movement of the blade 138 and the foremost plate 14 is prevented. With the blade 138 in the eject position, the foremost plate 14 is positioned in the holding structure 34, with a front portion of the plate 14 being disposed exterior to the housing 16 so as to be accessible by an operator.

After step 270, the routine 256 proceeds to step 272, wherein the routine 256 looks for an eject signal from the second position switch 176, which indicates that the blade 138 is in the eject position. Step 272 is repeated until an eject signal is detected. When an eject signal is detected, the routine 256 moves to step 274, wherein an open signal is generated and transmitted to the second blade solenoid valve 166 and a close signal is generated and transmitted to the first blade solenoid valve 164, thereby causing the second blade solenoid valve 166 to open and the first blade solenoid valve 164 to close. Compressed air enters into the second end cover 158 of the blade actuator 154 and moves the piston of the blade actuator 154 and, thus, the blade 138 to the retract position. After step 274, the routine 256 proceeds to step 276, wherein the routine 256 looks for a retract signal from the first position switch 174, which indicates that the blade 138 is in the retract position. Step 276 is repeated until a retract signal is detected. When a retract signal is detected, the routine 256 moves to step 278, wherein a close signal is generated and transmitted to the second blade solenoid valve 166, thereby causing the second blade solenoid valve 166 to close. After step 278, the routine 256 moves back to step 258 and the routine 256 is repeated. As can be appreciated from the foregoing description of the routine 256, the routine 256 does not move past step 264 in the next cycle of the routine 256 until an operator removes the plate from the holding structure 34 that was delivered in the prior cycle.

The routine 256 continues to repeat as described above until the piston of the push actuator 68 and, thus, the push carriage 50 reaches the third position switch 106 of the push actuator 68, which causes the third position switch 106 to generate and transmit the low signal to the PLC 214. When the routine 256 reaches step 260 in a cycle after the low signal is transmitted, the routine 256 detects the low signal and moves to step 280, wherein the routine 256 generates and transmits a low signal to the orange light 240 of the light tower 212, thereby lighting the orange light 240. The routine 256 then moves to step 264 and proceeds as described above.

If the plate feeder 10 is not stopped and filled with a new supply of plates 14, the piston of the push actuator 68 and, thus, the push carriage 50 will reach the empty position, which will cause the second position switch 104 to generate and transmit an empty signal to the PLC 214. When the routine 256 reaches step 258 in a cycle after the empty signal is transmitted, the routine 256 detects the empty signal and moves to step 282, wherein the routine 256 generates and transmits an empty signal to the red light 242 of the light tower 212, thereby lighting the red light 242. The routine 256 stops at step 282. At this point, the plate feeder 10 must be refilled with plates 14. The plate feeder 10 is refilled in accordance with the steps set forth above, i.e., moving the push carriage 50 to the full position, turning off the main power, opening the lid 38 and loading plates 14 into the magazine.

While the invention has been shown and described with respect to particular embodiments thereof, those embodiments are for the purpose of illustration rather than limitation, and other variations and modifications of the specific embodiments herein described will be apparent to those skilled in the art, all within the intended spirit and scope of the invention. Accordingly, the invention is not to be limited in scope and effect to the specific embodiments herein described, nor in any other way that is inconsistent with the extent to which the progress in the art has been advanced by the invention.

What is claimed is:

1. A feeder for supplying plates to a technician in a work area on an as-needed basis, said feeder comprising:
   a magazine for holding a stack of plates, said magazine having an ejection area from which a plate from the stack of plates may be moved into a holding structure;
   the holding structure for removably holding the plate in a holding position until the plate is removed by the technician, the holding structure including an inner entrance portion that defines an interior passage, the entrance portion being joined to an exit portion defining a narrow vertically-extending exterior opening, the entrance portion and the exit portion being secured to and extending upwardly from a horizontal lower wall, wherein said holding structure holds the plate so that the technician can remove the plate by pulling the plate from the holding structure;
   a plate detector mounted proximate to the holding structure, said plate detector being operable to detect absence of the plate in the holding position in the holding structure and to generate a plate absent signal representative thereof;
   an ejector apparatus having a blade that is movable between retract and eject positions, wherein a plate disposed in the ejection area is aligned with the interior passage of the holding structure such that movement of the blade from the retract to the eject position moves the plate disposed in the ejection area to the holding structure so as to be held by the holding structure in the holding position;
   a supply apparatus having a pusher that is movable in incremental amounts toward the ejection area, wherein movement of the pusher in an incremental amount toward the ejection area moves the stack of plates such that the plate from the stack is moved into the ejection area;
   a control system operable to receive the plate absent signal from the plate detector and, in response thereto, to control the ejector apparatus and the supply apparatus such that the plate is moved into the ejection area and then moved from the ejection area to the holding structure so as to be held by the holding structure in the holding position; and,
   wherein the holding structure exterior opening is in communication with the interior passage, and wherein when the plate is in the holding position, the plate extends through the exterior opening such that a portion of the plate is disposed in the interior passage and a further portion of the plate is disposed exterior to the holding structure so as to be accessible by the technician.

2. The feeder of claim 1, wherein the ejector apparatus further comprises a linear actuator connected to the blade and operable to move the blade between the retract and eject positions.

3. The feeder of claim 2, wherein the linear actuator of the ejector apparatus is pneumatic.

4. The feeder of claim 2, wherein the pusher is movable between full and empty positions, and wherein the pusher is movable in the incremental amounts from the full position to the empty position.

5. The feeder of claim 4, wherein the supply apparatus comprises a linear actuator connected to the pusher and operable to move the pusher between the full and empty positions.

6. The feeder of claim 5, wherein the linear actuator of the supply apparatus is pneumatic.

7. The feeder of claim 5, further comprising first, second and third position switches electrically connected to the control system and positioned along a travel path of the pusher between the full and empty positions, said first position switch being disposed proximate to the full position, said second position switch being disposed proximate to the empty position and said third position switch being disposed between the empty position and a midway point between the full and empty positions, said first, second and third position switches being operable to detect the presence of the pusher and to generate and transmit detection signals representative thereof to the control system, whereby a detection signal from the first position switch indicates that the supply of plates in the feeder is full, a detection signal from the second position switch indicates that the supply of plates in the feeder is depleted and a detection signal from the third position switch indicates that the supply of plates in the feeder is low.

8. The feeder of claim 1, wherein the blade has a non-linear edge, and wherein when the blade moves from the retract position to the eject position, the non-linear edge of the blade engages an edge of the plate disposed in the ejection area and pushes the plate to the holding position in the holding structure.

9. The feeder of claim 8, wherein the non-linear edge conforms to at least a portion of the edge of the plate in the ejection area.

10. The feeder of claim 8, wherein the non-linear edge is angular.

11. The feeder of claim 1, wherein the control system comprises a programmable logic controller.

12. The feeder of claim 1, wherein the plate detector is an inductive proximity sensor.

13. The feeder of claim 12, wherein the proximity sensor is mounted to the holding structure and includes a barrel that extends into the interior passage.

14. A feeder for supplying plates to a technician in a work area, said feeder comprising:
   a holding structure for holding plates, wherein the holding structure includes an inner entrance portion that defines an interior passage and includes a pair of inwardly-sloping walls that narrow the passage, the entrance portion joined to an outer L-shaped exit portion, said exit portion defines a narrow vertically-extending exit slot, and wherein the entrance portion and the exit portion are secured to and extend upwardly from a horizontal lower wall;
   a magazine having an ejection area adjoining the holding structure;
   a stack of plates disposed in the magazine, each of said plates having a non-linear rear edge;
   a supply apparatus having a pusher that is movable in incremental amounts toward the ejection area, wherein movement of the pusher in an incremental amount toward the ejection area moves the stack of plates such that the plate from the stack is moved into the ejection area;
   an ejector apparatus having a blade that is movable between retract and eject positions, said blade having a non-linear front edge that conforms to at least a portion of the rear edge of the plates, wherein when the blade moves from the retract position to the eject position, the front edge of the blade engages the rear edge of the plate disposed in the ejection area and pushes the plate to the holding structure so as to be held by the holding structure in a holding position; and a control system operable to control the ejector apparatus and the supply apparatus such that the plate is moved into the ejection area and then moved from the ejection area to the holding structure so as to be held by the holding structure in the holding position.

15. The feeder of claim 14, wherein the supply apparatus further comprises a linear actuator connected to the pusher and operable to move the pusher from a full position to an empty position in the incremental amounts.

16. The feeder of claim 15, wherein the ejector apparatus further comprises a linear actuator connected to the blade and operable to move the blade between the retract and eject positions.

17. The feeder of claim 16, wherein the linear actuators of the supply apparatus and the ejector apparatus are pneumatic.

18. The feeder of claim 16, further comprising a plate detector mounted proximate to the holding structure, said plate detector being operable to detect the absence of the plate in the holding position in the holding structure and to generate a plate absent signal representative thereof.

19. The feeder of claim 18, wherein the control system is operable to receive the plate absent signal from the plate detector and, in response thereto, to control the ejector apparatus and the supply apparatus to move the plate into the ejection area and then to the holding structure so as to be held by the holding structure in the holding position.

20. The feeder of claim 14, wherein the non-linear front edge of the movable blade is shaped so as to conform to at least a portion of the rear edge of automatic transmission separator plates.

21. The feeder of claim 14, wherein the control system comprises a programmable logic controller.

22. The feeder of claim 14, wherein the stack is a horizontal stack.

* * * * *